Jan. 29, 1963

C. M. STOVER 3,075,385

HYGROMETER

Filed Dec. 15, 1960

INVENTOR:
Clifford M. Stover
BY

Attorney

United States Patent Office 3,075,385
Patented Jan. 29, 1963

3,075,385
HYGROMETER
Clifford M. Stover, Albuquerque, N. Mex., assignor, by mesne assignments, to the United States of America as represented by the United States Atomic Energy Commission
Filed Dec. 15, 1960, Ser. No. 76,083
12 Claims. (Cl. 73—335)

The present invention relates generally to means adapted to accurately sense humidity under varying conditions and more particularly to a highly sensitive humidity measuring device for use in radiosondes.

Although the humidity measuring device of the present invention is particularly useful in connection with radiosonde work, it is also useful in many diverse environments, such as, for example, laboratory work, humidity control, household hygrometers, or any other environment where it is desirable to measure or control humidity.

In many instances, particularly in connection with humidity measuring work, it is desirable to use moisture sensing elements with very rapid response to abrupt changes in relative humidity. For example, where the relative humidity changes in slowly moving air from 100% to 0% or vice versa, it is essential to have the moisture sensing device change its reading on appropriate humidity indicating meters at least 90% in less than 5 seconds. It is also very desirable to have moisture sensing devices capable of measuring moisture in the high altitude or low pressure range of 2 to 50 microns absolute, and having a high sensitivity to moisture in the very low relative humidity range. When using known radiosondes in the above mentioned environments difficulties arise in that inaccurate or incomplete readings are attained due to the inabilities of the moisture sensing devices to change readings of the appropriate humidity indicating meters at rates comparable to the change in relative humidity or where the humidity range or pressure range is so low that the functions of the moisture measuring devices are interrupted and hence false readings are given.

The present invention aims to minimize or obviate the above and other difficulties or disadvantages by providing a new and improved humidity measuring device of relatively simple and inexpensive construction which is adapted to detect and measure moisture with great accuracy in a rapidly changing environment regardless of the pressure and humidity range. The invention further contemplates a moisture measuring device that will operate at higher temperatures than those known in the prior art.

An object of the present invention is to provide a new and improved miniaturized moisture measuring device having a high degree of accuracy and capable of rapid response to changing relative humidity levels.

Another object of the present invention is to provide a new and improved moisture measuring device capable of measuring moisture at very low relative humidity ranges.

Still another object of the present invention is to provide a moisture detecting means capable of measuring moisture at very high altitudes and at low atmospheric pressure ranges.

A further object of the present invention is to provide a moisture detecting means with the ability to measure and indicate moisture above 100% relative humidity.

A still further object of the present invention is to provide a moisture measuring device having a substantially straight line response between 0% and 100% relative humidity on a suitable humidity indicating meter used with the device.

Another object of the present invention is to provide a humidity measuring device which resists moisture damage.

And yet another object of the present invention is to provide a new and improved humidity measuring device with an active or sensing surface of very minute size.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
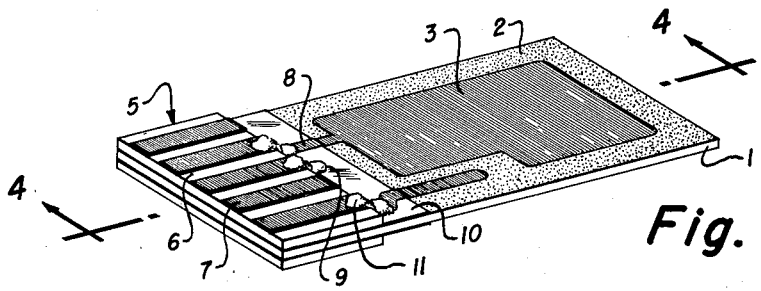
FIG. 1 is a perspective view showing one embodiment of the invention.

A more or less general description of the humidity sensing device of the present invention, and its functioning are set forth below to facilitate understanding the operation of the invention.

Reference numeral 1 designates the base member of the moisture measuring element, which may conveniently be rectangular in cross section and constructed of any metal capable of conducting electricity, with the surface thereof being coated with a suitable hygrometric material 2. For the purposes of illustration the base member 1 may be aluminum, for example, with the coating 2 being made an oxide formed by anodizing the base member 1. A metal coating or film 3, which may be formed by evaporative deposition, for example, is applied over a designated area of the oxide coating 2 to provide a second electrical conducting member. Suitable independent electrical leads 8 and 9 may connect the electrical conducting members 3 and 1, respectively, to a contact means 5 having a plurality of separate contacts or contact strips 7 thereon. The junction or connection of an electrical lead, such as lead 9, with the conducting base 1 may be formed by scratching away a small portion of the oxidized surface 2 at the particular area where connection is desired.

In some instances it may be desirable to place a moistureproof seal 10 between the contactor means 5 and the oxidized coating 2 on the base member so as to eliminate or minimize any moisture traps and also limit the active moisture absorbing area of the oxidized coating 2 to a predetermined size.

When the moisture sensing element is assembled the base member 1 and the film 3 each act as electrodes, insulated from one another by the oxidized coating 2. Thus, when a change in relative humidity occurs, a change in the resistance and capacitance between the two electrodes takes place, the amount of change being dependent upon the amount of humidity increase or decrease. The above mentioned capacitance and resistance change is brought about by the moisture absorbing abilities of the film and the anodized coating. Therefore, when a voltage is applied between the two electrodes via the contacts 7 and the leads 8 and 9, a change in the resistance and capacitance between the electrodes, due to a change in relative humidity, causes a proportional change in current between the electrodes which may be read upon any suitable indicator for determining the relative humidity at any given instant. A suitable indicator which may, for example, be used with the moisture sensing element of the present invention is a simple tester (not shown) which may comprise a source of 60 cycle alternating current coupled to a voltage lowering device such as a transformer which in turn is connected in series with a suitable meter upon which the degree of humidity may be read and the moisture sensing element.

Figure 2:
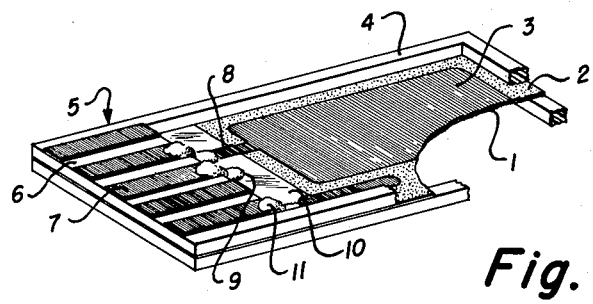
FIG. 2 is a perspective view showing an embodiment similar to that of FIG. 1 with the addition of a supporting frame.

Normally the base member is sufficiently rigid due to its thickness so as to be self supporting, however, if a base member of thinner proportions is desired, suitable supporting means may be employed. It has been found that a suitable framework may be placed on each side of the base member to accomplish such support. A satisfactory frame 4 as indicated in FIGURE 2, may be formed from an insulating material, such as plastic, and can be common with the insulating portion 6 of the contact means 5. The frame may be designed to cover only outer portions of the anodized surface 2 so as not to interfere in the operation of the moisture sensing element and may be fixedly attached to the base member 1 by any suitable means such as, for example, cement.

The frame above described is only an example of one type of base support, which can be satisfactorily used to strengthen the thin base member and the use of other frames of various materials and design will become obvious to another skilled in the art when practicing the invention.

Figure 3:
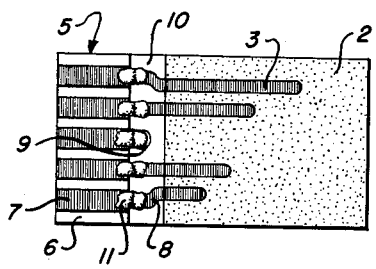
FIG. 3 is a plan view showing several humidity sensing surfaces on a single base.
Figure 4:
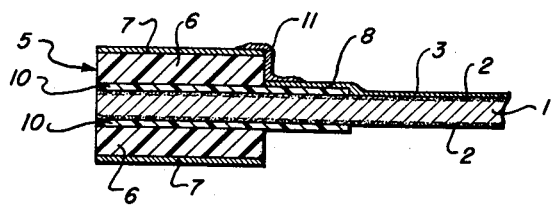
FIG. 4 is a sectional view showing in exaggerated form the cross section of the embodiment of FIG. 1.

The embodiment of the invention illustrated in FIGURE 3 is similar to the embodiments of FIGURES 1 and 2 except that a greater number of films 3 of different predetermined areas are coated on the anodized surface 2 of the base member. Separate leads 8 are placed between the contacts 7 and each of the films 3 so that any one of the films may be used at any particular instant, depending upon the quality of moisture sensitivity desired. The different films provide variable humidity sensing abilities according to the film area being selectively utilized. By merely switching voltage from one film area to another film area of different size, by suitable switching means (not shown) coupled to the contacts, a change in the sensitivity of the moisture sensing element is readily attained.

An amplified description of the various features of the invention will now be given.

The humidity responsive element comprises a metal base member 1 of good-electrical conductivity. While many different metals can be used as the base material, it is preferred to use hard drawn aluminum having at least 99% purity. A super pure aluminum material having a purity of 99.99% is the most desirable, but lesser purities can be used and still attain satisfactory results. The mass of the base member should be kept small to minimize the differences of temperature between the humidity being measured and the base member. A substantially uniform thickness of the base member 1 is desirable to accurately measure humidity and can vary for any single base member from a foil of about .0005 of an inch in thickness to a plate of about .125 of an inch thick. Where it is desired to measure relative humidity in an environment of rapidly changing temperature levels, it will be most advantageous to use a relatively thin base member, since the temperature changes in the base at a rate inversely proportional to the thickness of the base member. A smooth, brightly finished surface on the base member is preferable and a special chemical bright dip may be used for enhancing this brightness.

The base member 1 may be subjected to any suitable chemical treatment for forming the oxidized surface 2 thereon. This oxidizing treatment may, for example, be performed by an anodizing process comprising the placing of the base member for a predetermined time into a heated sulfuric acid solution while passing an alternating current through said solution. The solution may include 20% to 70% sulfuric acid by volume and be externally heated, by any suitable heating means, to a temperature of about 70° to 100° F. An alternating current of 5 to 25 amperes per square foot of anodizing surface passes through the solution while the base member is contained therein. The base member remains in the solution until a desired anodize is attained, which normally requires a time period of about 10 to 80 minutes depending on the percentage of acid in solution, temperature of solution, amount of alternating current being passed through the solution, and the desired thickness of the anodize.

Satisfactory surfaces 2 have been obtained by employing a 50% sulfuric acid solution having a specific weight of 1.4, maintained at 90° F., with alternating current of 12 amperes per square foot of anodizing surface during the anodizing. The base member was kept submerged in the solution for 25 minutes to attain the desired anodize thickness.

The anodized or oxidized surface coating on the base member is normally somewhat porous, so that moisture may pass through the surface coating to the base member. It is preferred to have the anodize coatings very thin and of approximately .000075 of an inch are satisfactory, however they may vary from this thickness to some extent and still give satisfactory results.

It has been found that at least in some instances anodized surface coatings tend to change in moisture absorbing qualities over a period of time and to obviate this change an aging and curing procedure is desirable so as to provide the coating with a substantially continuous moisture absorbing rate which is not objectionably affected by the passage of time. This procedure comprises placing the coated base members in a container of boiling distilled water for a period of 10 to 45 minutes. When anodizing the base member according to the above mentioned preferred anodize, 30 minutes in the boiling water affords good results.

When aging the coating by the boiling water method a somewhat loose oxide powder may form over the coating, which can be readily removed by scrubbing with a moderately stiff brush.

On the portion of the oxidized base member where the contact means are to be attached, it is desirable to minimize or prevent moisture traps which may cause error in humidity readings. Such prevention may be attained by placing between the contact means 5 and the oxidized surface 2 an appropriate sealing means in the form of a coating 10 which renders the oxidized coating 2 thereunder incapable of absorbing moisture. A suitable sealing means is a Lucite solution, which may be easily applied by dipping a predetermined length or area of the base member into a Lucite solution filled container. When applying the sealing solution it may be desired to seal an area larger than the area covered by the contact means 5, thus providing a sealed surface for the leads between the contact means 5 and the second electrode or film 3. The provision of the seal under the leads is advantageous in that the sensing area of the second electrode can readily be ascertained and controlled regardless of the area of the leads, since the sealed area has no objectionable moisture sensitivity.

The contact means may comprise, for example, an insulated base 6 made of any good commercially available non-conducting material. However, excellent results have been attained by using plastic, such as glass reinforced epoxy resin, as the insulating base material. The contact means 5 has on the surface thereof, a plurality of metal contacts 7 securely bonded to the contact means. Any number of contacts 7 may be placed on the insulated base member, but for the purpose of illustration, five contacts are shown. For the purpose of establishing a good electrical connection between a suitable connecting means of the circuitry, such as a clamping-type connector, and the humidity sensing device and yet minimize the possibility of short circuiting the device, it may be desired to place on the opposite or under side of the base member a suitable spacing and insulating means, such as, for example, a contact means identical to the contact means 5 on the upper side of the base member, thus insuring that the aluminum base member 1 remains electrically insulated from the circuitry except for the ground connection 9.

Although any suitable manner of attaching the contact means to the sealed portion of the base member may be used; it is advantageous to adhesively secure the contact means to the sealed base member by a commercially available adhesive, such as Eastman 910.

The second electrode 3 in the form of a film is placed over a predetermined area of the oxidized surface coating 2 and may be of any good electrical conducting metal such as aluminum, copper, gold, iron or platinum and can be affixed to the oxidized surface 2 in many different ways. One satisfactory method is to place the film 3 on the oxidized surface 2 by evaporative deposition, over an area defined by a template of desired configuration. When evaporatively depositing the film on the oxidized surface 2 it will be found that a very uniform film coating with excellent adhesive characteristics is formed, thus obviating the use of a securing medium between the film 3 and the oxidized surface 2. Excellent results may be attained by utilizing pure aluminum as the film material. The use of aluminum is considered highly advantageous in that it does not develop objectionable contact potential, which sometimes occurs when films of other metals are used. However, the precious metals are in some instances desirable due to their increased stability against natural oxidation.

The evaporative deposition of about 15 to 30 milligrams of metal for the film coating 3 may be conducted under vacuum of about one-tenth to one-fourth micron from a metal holding or containing means placed a suitable distance from the oxidized surface. When using a base member anodized in the preferred manner a suitable film may be formed upon the anodized surface by evaporatively depositing about 16 milligrams of 99.9% pure aluminum from a conical tungsten basket disposed about 6 inches from the anodized surface.

As briefly mentioned above, templates of desired configuration are preferably used to determine the area and shape of the metal film deposited upon the anodized surface. It may also be desirable to employ a template that provides a metal film lead 8 extending from the film coating 3 on the anodized surface over the sealed portion of the base member to the contact means 5. While it is desirable to form the leads between the metal film and the contact means in the above manner it will be obvious that other forms of leads, such as a small aluminum wire or the like may be coupled between the film and contact means by any suitable well known connecting means.

Since the metal film 3 may vary in moisture absorbing properties over a period of time, somewhat similarly to the oxidized surface 2 on the base member 1, it may be desirable to age and cure the film 3 in a manner similar to that used for the base member. Good aging and curing results are attained by dipping the film coated base member into boiling distilled water for a time period ranging between 5 to 30 seconds. This dipping removes, converts or oxidizes some of the metal film; thus apparently making the film more porous and sensitive to moisture.

In the disclosed embodiments a paint material 11 may be utilized to form a good connection between the leads 8 and the contacts 7. Silver paint, for example, appears to have very good connecting properties and can readily be used to form the desired connection. Although a paint material is disclosed as the preferred connecting agent, it will be obvious that many different types of connections, such as soldering, or cementing can readily be used in place of the paint material.

For the purposes of illustration, the steps of manufacturing an element of the preferred type may follow the order set forth below.

A 6 inch by 12 inch plate of 99.99% pure aluminum of desired thickness and having a bright smooth mirror-like surface is prepared for anodizing by applying a chemical dip to enhance the brightness of the surface. A thorough degreasing of the plate surface by well known degreasing means is desirable prior to anodizing.

The anodizing is then accomplished by submerging the plate into a 50% sulfuric acid solution having a specific weight of 1.4 and being maintained at 90° F. An alternating current having a density of 12 amperes per square foot of plate surface is used for 25 minutes. The anodized plate is then thoroughly rinsed in water and air dried.

The anodized plate may be cut into ⅞ inch by 1⅝ inch pieces which size for the purpose of this illustration is sufficient to contain the desired number and sizes of the films 3 so as to suitably perform its intended function in humidity sensing work. Care should be exercised when cutting the plate so as not to mar or contaminate the anodized surface 2.

The pieces of the anodized plate or base members are then placed into the boiling distilled water for 30 minutes for the purposes of aging, expanding and curing the anodize.

Approximately ⅝ inch of one end of each piece is dipped into the Lucite solution to provide a moisture proof seal 10 over that portion of the anodize on the base member 1.

Contactors 5 (which may be formed by known printed circuit techniques) with the insulated portion having the dimensions of ⅜ inch by ⅞ inch by 1/64 inch thick with 5 metal contacts 7 thereon, are shown cemented to each side of the base member over the sealed portion 10.

A template of predetermined configuration is placed over the anodized surface 2 of the base member 1. The particular design of the template is dependent upon the circuitry to be used and the sensitivity of the element desired.

Approximately 16 milligrams of 99.9% pure aluminum is evaporated over the areas designated by the template. The evaporation deposition is accomplished in a vacuum from a conical tungsten basket mounted 6 inches from the surface of the base member. The deposit causes a thin porous film 3 of aluminum to be formed over a portion of the active anodize 2 on base member 1. The deposit may also form the leads 8 over the sealed portion of the base member.

The base member having the evaporated film thereon is thereafter immersed into boiling water for not more than about 30 seconds, which seems to open the pores in the film coating and form an oxide on the clean evaporated aluminum.

Silver paint is then applied to complete the connection 11 between the evaporatively formed leads 8 and the contacts 7.

The resulting device is a new and improved moisture sensing element that responds to greater than the entire 0–100% relative humidity range, whereas the presently known and widely used moisture sensing devices respond to relative humidity only in the 20% to 95% range. The moisture sensing element has a response time approximately 10 times faster than the response time of previously known moisture sensing devices and is capable of being used in an environment where moisture, such as rain, may come into contact with the element, since only a temporary disruption in the element operation will occur with the normal operation returning upon the evaporation of the moisture from the element surface.

As various changes may be made in the form, con-

I claim:

1. The method of manufacturing a humidity sensing element which comprises providing a substantially pure metal base having electrical conducting properties, immersing said base for a predetermined time into an acid solution, heating said solution, passing an alternating current through said solution to form an oxide coating on said base, thereafter submerging the oxidized base into boiling water, covering an oxidized portion of said base with a sealing solution to isolate said portion from humidity, attaching electrical contact means having at least one contact to the sealed portion of said base, evaporatively depositing a film of metal taken from the group consisting of aluminum, gold, platinum, iron and copper on a portion of said base free of said sealing solution, establishing an electrical connection betwen said film and said contact, and electrically connecting said base to said contact means.

2. The method as claimed in claim 1 including providing said base with a smooth, bright mirror-like surface, employing said acid solution at 20% to 70% sulfuric acid by volume, utilizing a time period for oxidizing the surface of said base within the range of 10 to 80 minutes, and submerging said base in said boiling water for a period ranging from 10 to 45 minutes.

3. The method of claim 2 together with employing a base thickness in the range of .0005 to .125 of an inch, and maintaining the temperature of said acid solution in the range of 70° to 100° F.

4. The method of claim 3 together with maintaining the alternating current in the range of 5 to 25 amperes per square foot of oxidizing surface on said base.

5. The method of manufacturing a humidity sensing element comprising the steps of placing an aluminum base member in a heated sulfuric acid solution having an alternating current passing therethrough, thereafter boiling said base member in water for a desired time, forming a film of metal on said base member by evaporative deposition, and providing electrical leads from said film and said base member to electrical contact means.

6. The method of manufacturing a humidity sensing element which comprises the providing a 99.5 to 99.9% pure aluminum base member having a uniform thickness in the range of .0005 to .125 of an inch, submerging said base member into a liquid bath including 50% sulfuric acid by volume, said bath being maintained at a temperature of at least 80° F. and having an alternating current of at least 12 amperes per square foot of base member passing therethrough for oxidizing the surface of said base member, thereafter placing the oxidized base member into boiling water for at least 20 minutes, removing said base member and placing on a first portion of the surface thereof a humidity sealing solution for isolating said portion from humidity, attaching an electrical contactor means having at least one contact thereon to the sealed portion of said base member, placing a template on a second portion of said oxidized base member, providing a metal film on said second portion by evaporative deposition, immersing the entire oxidized and filmed base member into boiling water for at least 10 seconds, and providing said base member with electrical connections between the film and the contact and connecting said aluminum base member to said contactor means.

7. The method of claim 6 together with employing the template to form electrical conducting leads to the contactor means.

8. The method of claim 6 including the step of providing said oxidized base member with a plastic supporting frame.

9. A humidity sensing element of the type described comprising an elongated aluminum base of substantially uniform thickness in the range of .0005 to .125 inch and of at least 99.5% purity, having an oxidized surface of predetermined thickness, humidity sealing means overlying a portion of the oxidized surface adjacent one end of said base, electrical contact means attached to said sealing means, at least a single film coating of electrical conducting metal overlying a portion of the oxidized surface free of said sealing means, and electrical leads connecting said film to the electrical contact means.

10. The element according to claim 9 wherein a plurality of separate film coatings of differing areas overlie different portions of said oxidized surface and each is provided with a separate lead to the contact means.

11. The element of claim 9 in which the base is provided with a supporting frame having an aperture therein of size to form a predetermined area of said oxidized base for exposure to the atmosphere.

12. A humidity sensing element made by the method of claim 1.

References Cited in the file of this patent

UNITED STATES PATENTS

| | | |
|---|---|---|
| 2,036,740 | Bengston | Apr. 7, 1936 |
| 2,405,662 | McManus et al. | Aug. 13, 1946 |
| 2,860,221 | Kohl | Nov. 11, 1958 |